(12) United States Patent
Lee et al.

(10) Patent No.: US 8,836,905 B2
(45) Date of Patent: Sep. 16, 2014

(54) METHOD FOR MANUFACTURING LIQUID CRYSTAL DISPLAY DEVICE AND LIQUID CRYSTAL DISPLAY DEVICE

(75) Inventors: Kuancheng Lee, Guangdong (CN); Chihhsien Li, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 160 days.

(21) Appl. No.: 13/520,172

(22) PCT Filed: May 18, 2012

(86) PCT No.: PCT/CN2012/075695
§ 371 (c)(1),
(2), (4) Date: Jun. 29, 2012

(87) PCT Pub. No.: WO2013/166745
PCT Pub. Date: Nov. 14, 2013

(65) Prior Publication Data
US 2013/0300971 A1 Nov. 14, 2013

(30) Foreign Application Priority Data

May 9, 2012 (CN) .......................... 2012 1 0142085

(51) Int. Cl.
*G02F 1/1339* (2006.01)
(52) U.S. Cl.
USPC ............ 349/153; 349/154; 349/189; 349/190

(58) Field of Classification Search
CPC ...................................... G02F 1/1339
USPC .................. 349/189–190, 192, 153–154
See application file for complete search history.

(56) References Cited

U.S. PATENT DOCUMENTS 7,202,932 B2 * 4/2007 Niwa et al. .................... 349/154
8,300,202 B2 * 10/2012 Tanaka .......................... 349/156

FOREIGN PATENT DOCUMENTS

TW 594209 6/2004

* cited by examiner

*Primary Examiner* — James Dudek
(74) *Attorney, Agent, or Firm* — Cheng-Ju Chiang

(57) ABSTRACT

The present invention provides a method for manufacturing a liquid crystal display device and a liquid crystal display device. The method includes (1) preparing a TFT substrate and a CF substrate; (2) applying sealant resin to the TFT substrate or CF substrate to form an enclosing resin frame body that forms an entry opening on the CF substrate or the TFT substrate; (3) applying sealant resin to the entry opening of the enclosing resin frame body to form a closing section; (4) filling liquid crystal inside the enclosing resin frame body; (5) bonding the TFT substrate and the CF substrate together; and (6) subjecting the bonded TFT substrate and the CF substrate to curing at high temperature in order to cure the enclosing resin frame body.

6 Claims, 3 Drawing Sheets

METHOD FOR MANUFACTURING LIQUID CRYSTAL DISPLAY DEVICE AND LIQUID CRYSTAL DISPLAY DEVICE

BACKGROUND OF THE INVENTION

1. Field of the Invention

The present invention relates to the field of manufacture of liquid crystal display device, and in particular to a method for manufacturing a liquid crystal display device and a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal polymer molecules interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images.

Referring to FIG. 1, a liquid crystal display device is generally composed of an upper structure 100 of color filter (CF), a lower substrate 200 of thin film transistor (TFT), and liquid crystal (LC) 300, spacers 400, and sealant 500 interposed between the upper substrate 100 and the lower substrate 200. A general manufacturing process comprises a front stage of array process (including thin film, yellow light, etching, and film stripping), an intermediate stage of cell process (including bonding of TFT substrate and the CF substrate), and a rear stage of assembling process (including mounting of drive ICs and printed circuit board). The front stage of array process generally manufactures the TFT substrate in order to control the movement of liquid crystal molecules. The intermediate stage of cell process generally introduces liquid crystal between the TFT substrate and the CF substrate. The rear stage of assembling process generally mounts the drive ICs and combining the printed circuit board to effect driving the liquid crystal molecules to rotate for displaying images.

The process of introducing liquid crystal between the TFT substrate and the CF substrate is generally a process referred to as one drop filling (ODF), which generally comprises several steps of coating resin frame, filling liquid crystal, vacuum assembling, and high temperature curing. The step of filling liquid crystal is generally carried out with a distribution process or a vacuum filling method.

In the vacuum filling process, an enclosing resin frame that has an entry opening is formed between the TFT substrate and the CF substrate. The TFT substrate and the CF substrate are first bonded together and then liquid crystal is filled between the TFT substrate and the CF substrate through the entry opening of the enclosing resin frame. However, with the increase of the size of the liquid crystal display device, the vacuum filling process takes more and more time to complete. The severely affects the manufacture performance.

In the distribution method, an enclosing mold frame that has no entry opening is formed between the TFT substrate and the CF substrate. The liquid crystal is first filled inside the enclosing resin frame and then the TFT substrate and the CF substrate are bonded to each other. It is, however, generally difficult to control the amount of liquid crystal filled in the process of filling liquid crystal with the distribution method. When the liquid crystal is over-filled (as shown in FIG. 2), deformation of the TFT substrate 200 and the CF substrate 100 may result due to thermal expansion. This will cause abnormal conditions of for example inhomogeneous displaying color.

SUMMARY OF THE INVENTION

An object of the present invention is to provide a method for manufacturing a liquid crystal display device, which comprises an enclosing resin forming a recoverable entry opening, whereby adjustment of the amount of liquid crystal filled between a TFT substrate and a CF substrate is made possible to eliminate the potential problem of thermal deformations of the TFT substrate and the CF substrate due to excess of liquid crystal.

Another object of the present invention is to provide a liquid crystal display device, which comprises an enclosing resin frame that forms a recoverable entry opening, whereby adjustment of the amount of liquid crystal filled between a TFT substrate and a CF substrate is made possible to eliminate the potential problem of thermal deformations of the TFT substrate and the CF substrate due to excess of liquid crystal.

To achieve the objects, the present invention provides a method for manufacturing a liquid crystal display device, which comprises the following steps:

Step 1: preparing a TFT substrate and a CF substrate;

Step 2: selecting one of sides of the CF substrate or the TFT substrate as a starting side and applying sealant resin from an edge of the starting side in an inward curving manner and continuing the application to the remaining ones of the sides in a sequential manner to circle back to the starting side, where the application is made in an outward curving manner to reach the starting edge and oppose the starting end of the sealant resin, whereby the sealant resin forms an enclosing resin frame body that forms an entry opening on the CF substrate or the TFT substrate;

Step 3: applying sealant resin to the entry opening of the enclosing resin frame body to form a closing section;

Step 4: filling liquid crystal inside the enclosing resin frame body;

Step 5: bonding the TFT substrate and the CF substrate together; and

Step 6: subjecting the bonded TFT substrate and the CF substrate to curing at high temperature in order to cure the enclosing resin frame body.

The CF substrate comprises a black matrix formed thereon and the closing section is positioned relative to the black matrix of the CF substrate so as to be located outside the black material of the CF substrate.

The closing section is spaced from the starting edge by 200 mm-500 mm.

The method for manufacturing a liquid crystal display device further comprises the following steps:

Step 7: inspecting if deformation is caused on the TFT substrate and the CF substrate by excessive filling of liquid crystal and going to the next step if deformation occurs and ending the process if no deformation occurs;

Step 8: applying laser to remove the closing section at the entry opening of the enclosing resin frame body;

Step 9: expelling excessive liquid crystal through the entry opening of the enclosing resin frame body;

Step 10: repairing the closing section by re-filling sealant resin into the entry opening through a vacuum filling process in order to form a closing section that closes the entry opening again; and Step 11: carrying out curing at a high temperature so as to cure the re-filled sealant resin.

The re-filled sealant resin is positioned relative to the black matrix of the CF substrate so as to be located outside the back matrix of the CF substrate.

The re-filled sealant resin is spaced from the edge of the starting side of the CF substrate or the TFT substrate that serves as the starting edge by a distance of 200 mm-500 mm.

The present invention also provides a liquid crystal display device, which comprises: a TFT substrate, a CF substrate that is opposite to and bonded to the TFT substrate, liquid crystal that is interposed between the TFT substrate and the CF substrate, and an enclosing resin frame body that encloses the liquid crystal. The enclosing resin frame body is arranged along circumference of the CF substrate or the TFT substrate. The enclosing resin frame body forms an entry opening, which is delimited by two opposite sides extending outward from one side of the CF substrate or the TFT substrate in a curved manner to reach an edge of said side. The entry opening is provided with a closing section for closing the entry opening.

The CF substrate comprises a black matrix formed thereon and the closing section is positioned relative to the black matrix of the CF substrate so as to be located outside the black matrix of the CF substrate.

The closing section is spaced from the edge of the side of the TFT substrate or the CF substrate to which the entry opening corresponds by a distance of 200 mm-500 mm.

The TFT substrate and the CF substrate comprise spacers arranged therebetween.

The efficacy of the present invention is that the present invention provides a method for manufacturing a liquid crystal display device, which, during the application of a sealant resin, directly forms an enclosing resin frame body that has an entry opening and further forms a recoverable closing section at the entry opening, whereby when it is identified later that deformation is caused on the TFT substrate and the CF substrate due to excessive filling of liquid crystal, the closing section can be removed first in order to expel an excessive amount of the liquid crystal through the entry opening and then the closing section is repaired. The operation is simple and easy. A liquid crystal display device manufactured with the method of the present invention comprises an enclosing resin frame body that forms a recoverable entry opening, whereby adjustment of the amount of liquid crystal between the TFT substrate and the CF substrate can be effected so that thermal deformation of the TFT substrate and the CF substrate due to excessive liquid crystal can be eliminated and the cost for re-working can thus be reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
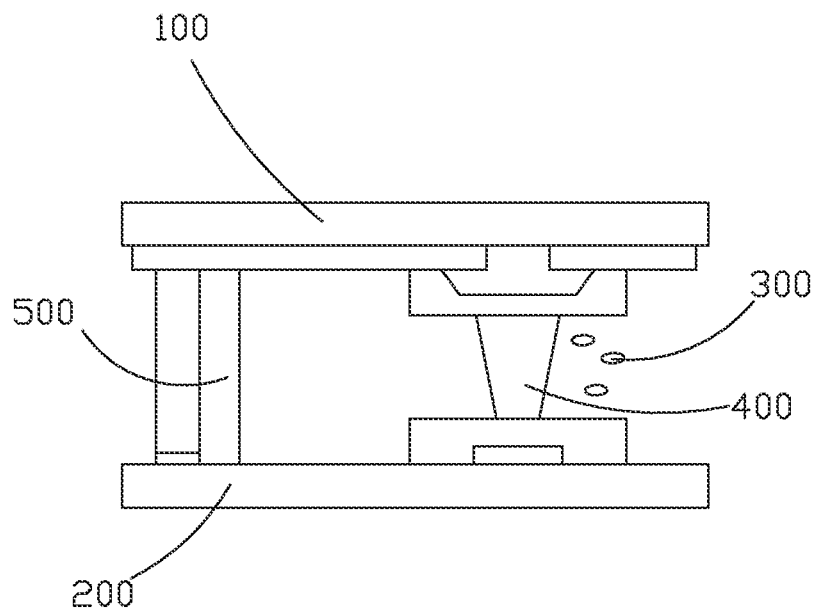
FIG. 1 is a schematic view showing the structure of a conventional liquid crystal display device.
Figure 2:
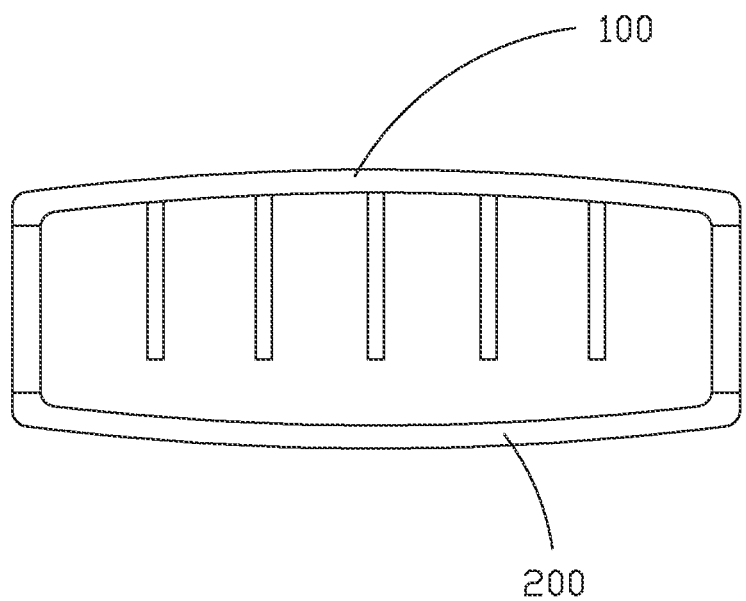
FIG. 2 is a schematic view illustrating thermal deformation of a TFT substrate and a CF substrate due to excessively filled liquid crystal in the conventional liquid crystal display device.
Figure 3:
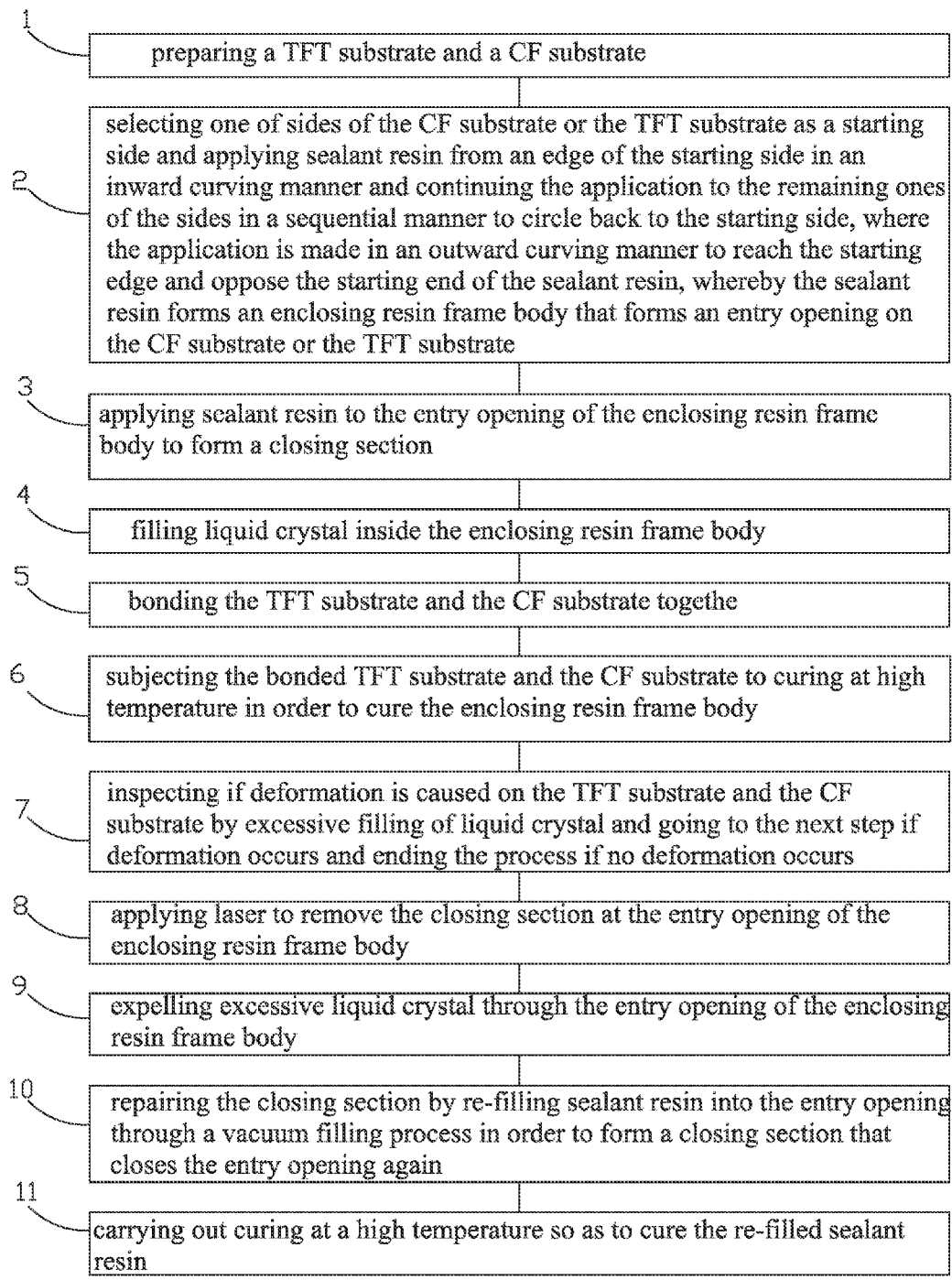
FIG. 3 is a flow chart illustrating a method for manufacturing liquid crystal display device according to the present invention.
Figure 4:
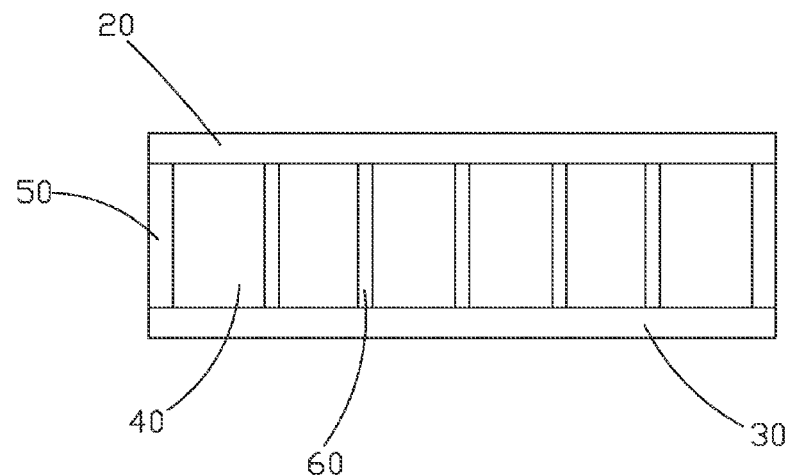
FIG. 4 is a schematic view showing the structure of a liquid crystal display device according to the present invention.
Figure 5:
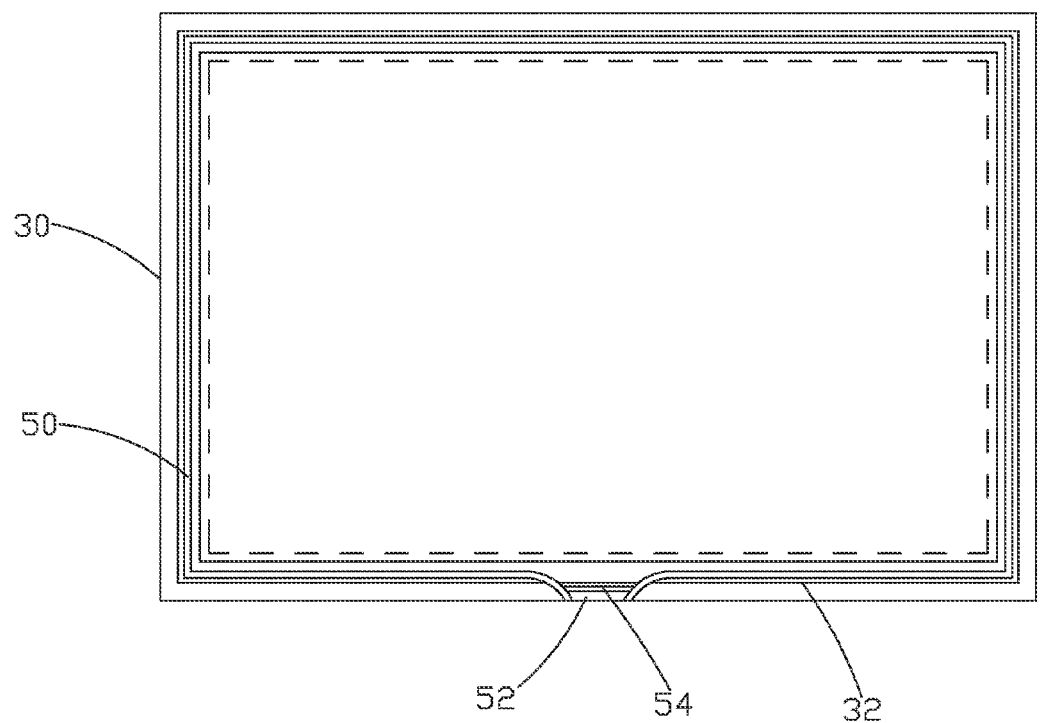
FIG. 5 is a schematic plan view showing an enclosing resin frame of the liquid crystal display device according to the present invention.

Referring to FIG. 3, as well as FIGS. 4 and 5, the present invention provides a method for manufacturing a liquid crystal display device, which comprises the following steps:

Step 1: preparing a TFT substrate 20 and a CF substrate 30. The CF substrate 30 comprises a black matrix 32 formed thereon.

The TFT substrate 20 and the CF substrate 30 are manufactured through the operations of thin film, yellow light, etching, and film stripping and the specific operations used can be any of the known operations.

Step 2: selecting one of sides of the CF substrate 30 or the TFT substrate 20 as a starting side and applying sealant resin from an edge of the starting side in an inward curving manner and continuing the application to the remaining ones of the sides in a sequential manner to circle back to the starting side, where the application is made in an outward curving manner to reach the starting edge and oppose the starting end of the sealant resin, whereby the sealant resin forms an enclosing resin frame body 50 that forms an entry opening 52 on the CF substrate 30 or the TFT substrate 20. The starting end and the terminating end of the sealant resin constitute the opposite sides of the entry opening 52.

Step 3: applying sealant resin to the entry opening 52 of the enclosing resin frame body 50 to form a closing section 54 that closes the entry opening 52.

The closing section 54 is positioned relative to the black matrix 32 of the CF substrate 30 as to be located outside the black matrix 32 of the CF substrate 30. The potential risk of damaging the black matrix 32 in a subsequent operation of removing the closing section 54, which might lead to poor displaying in a display zone (area surrounded by phantom lines of FIG. 5), can be eliminated.

The closing section 54 is set to space from the starting edge by 200 mm-500 mm in order to eliminate undesired cutting of the closing section 54 that leads to leakage of liquid crystal in cutting the liquid crystal panel.

Step 4: filling liquid crystal 40 inside the enclosing resin frame body 50.

An ODF (One Drop Filling) process is employed to fill the liquid crystal 40 inside the enclosing resin frame body 50.

Step 5: bonding the TFT substrate 20 and the CF substrate 30 together.

Step 6: subjecting the bonded TFT substrate 20 and the CF substrate 30 to curing at high temperature in order to cure the enclosing resin frame body 50.

Step 7: inspecting if deformation is caused on the TFT substrate 20 and the CF substrate 30 by excessive filling of liquid crystal and going to the next step if deformation occurs and ending the process if no deformation occurs.

Step 8: applying laser to remove the closing section 54 at the entry opening 52 of the enclosing resin frame body 50 to thereby open the entry opening 52.

Step 9: expelling excessive liquid crystal 40 through the entry opening 52 of the enclosing resin frame body 50 to thereby adjust the amount of the liquid crystal 40.

Step 10: repairing the closing section 54 by re-filling sealant resin into the entry opening 52 through a vacuum filling process in order to form a closing section 54 that closes the entry opening 52 again.

The re-filled sealant resin is applied to the same location as the original closing section 54. In other words, the re-filled sealant is positioned relative to the black matrix 32 of the 30 as to be located outside the black matrix 32 of the CF substrate 30. Specifically, the re-filled sealant resin is spaced from the starting edge corresponding to the entry opening 52 by a distance of 200 mm-500 mm, namely being spaced from the edge of the side of the CF substrate 30 or the TFT substrate 20 that serves as the starting edge by the distance of 200 mm-500 mm.

Step 11: carrying out curing at a high temperature so as to cure the re-filled sealant resin.

The method for manufacturing a liquid crystal display device according to the present invention is equally applicable to the case of insufficiency of liquid crystal. When inspection indicates that the amount of liquid crystal filled between the TFT substrate and the CF substrate is insufficient, the closing section is removed in a similar way and an additional amount of liquid crystal is filled through the entry opening to supplement the sufficiency of liquid crystal. The sealant resin is then applied to repair the closing section for closing the entry opening and the closing section is cured.

Referring to FIGS. 4 and 5, the present invention also provides a liquid crystal display device that is manufactured with the above discussed manufacturing method. The liquid crystal display device comprises a TFT substrate 20, a CF substrate 30 that is opposite to and bonded to the TFT substrate 20, liquid crystal 40 that is interposed between the TFT substrate 20 and the CF substrate 30, and an enclosing resin frame body 50 that encloses the liquid crystal 40. The CF substrate 30 comprises a black matrix 32 formed thereon. The enclosing resin frame body 50 is located between the CF substrate 30 and the TFT substrate 20 and is arranged along circumference of the CF substrate 30 or the TFT substrate 20. The enclosing resin frame body 50 forms an entry opening 52. The entry opening 52 is delimited by two opposite sides, which extends outward from one side of the CF substrate 30 or the TFT substrate 20 in a curved manner to reach an edge of said side. The entry opening 52 is provided with a closing section 54 for closing the entry opening 52 thereby sealing the liquid crystal 40 inside the enclosing resin frame body 50.

FIG. 5 illustrates an example where the enclosing resin frame body 50 is provided on the CF substrate 30. The closing section 54 is positioned relative to the black matrix 32 of the CF substrate 30 so as to be located outside the black matrix 32 of the CF substrate 30. Specifically, the closing section 54 is spaced from the edge of the side of the TFT substrate 20 or the CF substrate 30 to which the entry opening 52 corresponds by a distance of 200 mm-500 mm.

The TFT substrate 20 and the CF substrate 30 also comprise spacers 60 arranged therebetween to support the TFT substrate 20 and the CF substrate 30 for protecting the liquid crystal 40 between the TFT substrate 20 and the CF substrate 30 from being compressed and thus leading to poor displaying.

In summary, the present invention provides a method for manufacturing a liquid crystal display device, which, during the application of a sealant resin, directly forms an enclosing resin frame body that has an entry opening and further forms a closing section at the entry opening to allow easy removal of the closing section when it is identified in later that deformation is caused on the TFT substrate and the CF substrate due to excessive filling of liquid crystal so that an excessive amount of the liquid crystal can be expelled through the opened entry opening and then the closing section is repaired. The operation is simple and easy. A liquid crystal display device manufactured with the manufacturing method of the present invention comprises an enclosing resin frame body that forms a recoverable entry opening, whereby adjustment of the amount of liquid crystal between the TFT substrate and the CF substrate can be effected to ensure proper amount of liquid crystal contained, thermal deformation of the TFT substrate and the CF substrate due to excessive liquid crystal can be eliminated, and the cost for re-working can thus be reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a liquid crystal display device, comprising the following steps:
   (1) preparing a thin film transistor (TFT) substrate and a color filter (CF) substrate;
   (2) selecting one of sides of the CF substrate or the TFT substrate as a starting side and applying sealant resin from an edge of the starting side in an inward curving manner and continuing the application to the remaining ones of the sides in a sequential manner to circle back to the starting side, where the application is made in an outward curving manner to reach the starting edge and oppose the starting end of the sealant resin, whereby the sealant resin forms an enclosing resin frame body that forms an entry opening on the CF substrate or the TFT substrate;
   (3) applying sealant resin to the entry opening of the enclosing resin frame body to form a closing section;
   (4) filling liquid crystal inside the enclosing resin frame body;
   (5) bonding the TFT substrate and the CF substrate together; and
   (6) subjecting the bonded TFT substrate and the CF substrate to curing at high temperature in order to cure the enclosing resin frame body;
   wherein the closing section is spaced from the starting edge by 200 mm-500 mm.

2. The method for manufacturing a liquid crystal display device as claimed in claim 1, wherein the CF substrate comprises a black matrix formed thereon and the closing section is positioned relative to the black matrix of the CF substrate so as to be located outside the black matrix of the CF substrate.

3. The method for manufacturing a liquid crystal display device as claimed in claim 1 further comprising the following steps:
   (7) inspecting if deformation is caused on the TFT substrate and the CF substrate by excessive filling of liquid crystal and going to the next step if deformation occurs and ending the process if no deformation occurs;
   (8) applying laser to remove the closing section at the entry opening of the enclosing resin frame body;

(9) expelling excessive liquid crystal through the entry opening of the enclosing resin frame body;
(10) repairing the closing section by re-filling sealant resin into the entry opening through a vacuum filling process in order to form a closing section that closes the entry opening again; and
(11) carrying out curing at a high temperature so as to cure the re-filled sealant resin.

4. The method for manufacturing a liquid crystal display device as claimed in claim 3, wherein the re-filled sealant resin is positioned relative to the black matrix of the CF substrate so as to be located outside the back matrix of the CF substrate.

5. The method for manufacturing a liquid crystal display device as claimed in claim 3, wherein the re-filled sealant resin is spaced from the edge of the starting side of the CF substrate or the TFT substrate that serves as the starting edge by a distance of 200 mm-500 mm.

6. A method for manufacturing a liquid crystal display device, comprising the following steps:
(1) preparing a thin film transistor (TFT) substrate and a color filter (CF) substrate;
(2) selecting one of sides of the CF substrate or the TFT substrate as a starting side and applying sealant resin from an edge of the starting side in an inward curving manner and continuing the application to the remaining ones of the sides in a sequential manner to circle back to the starting side, where the application is made in an outward curving manner to reach the starting edge and oppose the starting end of the sealant resin, whereby the sealant resin forms an enclosing resin frame body that forms an entry opening on the CF substrate or the TFT substrate;
(3) applying sealant resin to the entry opening of the enclosing resin frame body to form a closing section;
(4) filling liquid crystal inside the enclosing resin frame body;
(5) bonding the TFT substrate and the CF substrate together;
(6) subjecting the bonded TFT substrate and the CF substrate to curing at high temperature in order to cure the enclosing resin frame body;
(7) inspecting if deformation is caused on the TFT substrate and the CF substrate by excessive filling of liquid crystal and going to the next step if deformation occurs and ending the process if no deformation occurs;
(8) applying laser to remove the closing section at the entry opening of the enclosing resin frame body;
(9) expelling excessive liquid crystal through the entry opening of the enclosing resin frame body;
(10) repairing the closing section by re-filling sealant resin into the entry opening through a vacuum filling process in order to form a closing section that closes the entry opening again; and
(11) carrying out curing at a high temperature so as to cure the re-filled sealant resin;
wherein the CF substrate comprises a black matrix formed thereon and the closing section is positioned relative to the black matrix of the CF substrate so as to be located outside the black matrix of the CF substrate;
wherein the closing section is spaced from the starting edge by 200 mm-500 mm;
wherein the re-filled sealant resin is positioned relative to the black matrix of the CF substrate so as to be located outside the back matrix of the CF substrate;
wherein the re-filled sealant resin is spaced from the edge of the starting side of the CF substrate or the TFT substrate that serves as the starting edge by a distance of 200 mm-500 mm.

* * * * *